US012609748B2

(12) United States Patent
Raghavan et al.

(10) Patent No.: US 12,609,748 B2
(45) Date of Patent: Apr. 21, 2026

(54) USER-EQUIPMENT-REQUESTED BEAMFORMING CALIBRATION

(71) Applicant: QUALCOMM Incorporated, San Diego, CA (US)

(72) Inventors: Vasanthan Raghavan, West Windsor Township, NJ (US); Kobi Ravid, Closter, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 487 days.

(21) Appl. No.: 18/340,598

(22) Filed: Jun. 23, 2023

(65) Prior Publication Data

US 2024/0429989 A1    Dec. 26, 2024

(51) Int. Cl.
*H04B 7/06* (2006.01)
*H04W 16/28* (2009.01)

(52) U.S. Cl.
CPC ........... *H04B 7/063* (2013.01); *H04B 7/0617* (2013.01); *H04W 16/28* (2013.01)

(58) Field of Classification Search
CPC .... H04B 7/063; H04B 7/0617; H04B 7/0695; H04B 7/0802; H04B 7/0602; H04B 7/086; H04W 16/28
USPC ........................................ 455/63.4, 25, 13.3
See application file for complete search history.

(56) References Cited

U.S. PATENT DOCUMENTS

| | | | | |
|---|---|---|---|---|
| 2012/0064841 A1* | 3/2012 | Husted | .................. | H04B 7/086 |
| | | | | 455/78 |
| 2018/0123648 A1* | 5/2018 | Nagaraja | ................ | H04B 7/043 |
| 2018/0254839 A1* | 9/2018 | Yuan | ...................... | H04B 7/046 |
| 2020/0145070 A1* | 5/2020 | Raghavan | ............. | H04B 7/088 |
| 2020/0195320 A1* | 6/2020 | Raghavan | ............. | H04L 5/0057 |
| 2021/0050892 A1* | 2/2021 | Park | ...................... | H04B 7/0696 |
| 2021/0050893 A1* | 2/2021 | Park | ...................... | H04L 5/0048 |
| 2021/0306064 A1* | 9/2021 | Abedini | ................ | H04B 7/043 |
| 2021/0400513 A1* | 12/2021 | Raghavan | ............. | H04B 17/21 |

* cited by examiner

*Primary Examiner* — Juan A Torres
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may store a beamforming calibration configuration including one or more beamforming parameters. The UE may detect one or more trigger conditions. The UE may transmit a beamforming calibration update request as a result of detecting the one or more trigger conditions. The UE may receive one or more beamforming assistance signals in response to the beamforming calibration update request. The UE may update at least one of the one or more beamforming parameters in the beamforming calibration configuration based, at least in part, on the one or more beamforming assistance signals. Numerous other aspects are described.

30 Claims, 10 Drawing Sheets

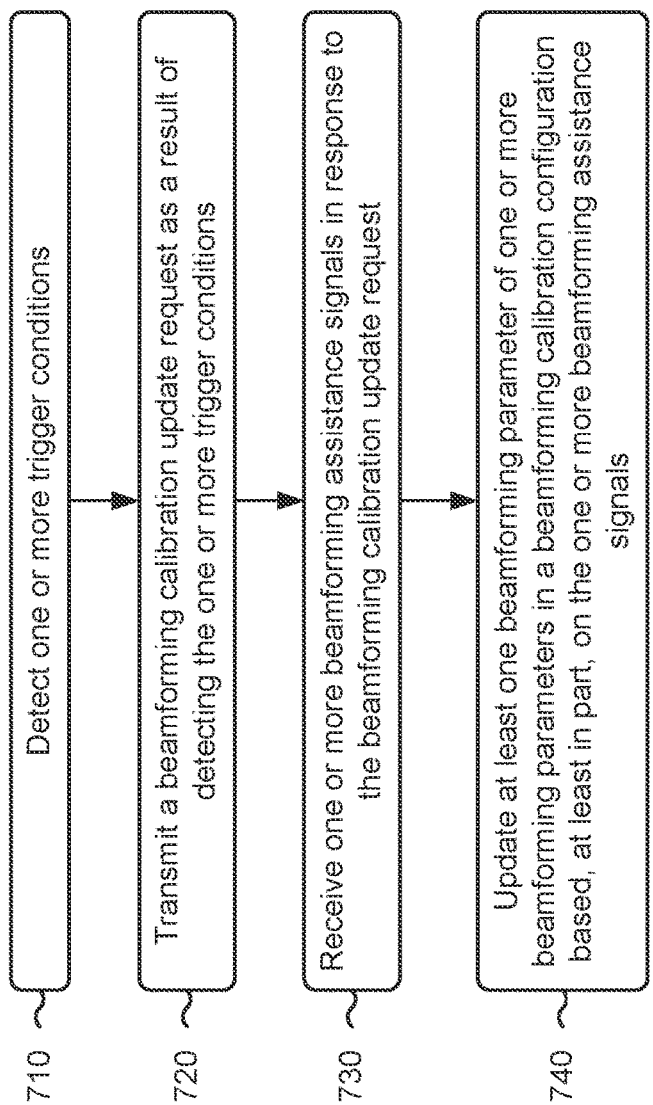

710   Detect one or more trigger conditions

720   Transmit a beamforming calibration update request as a result of detecting the one or more trigger conditions 730   Receive one or more beamforming assistance signals in response to the beamforming calibration update request 740   Update at least one beamforming parameter of one or more beamforming parameters in a beamforming calibration configuration based, at least in part, on the one or more beamforming assistance signals

Receive a beamforming calibration update request as a result of a user equipment (UE) detecting one or more trigger conditions associated with one or more beamforming parameters included in a beamforming calibration configuration

820

Transmit one or more beamforming assistance signals in response to the beamforming calibration update request, the one or more beamforming assistance signals including information for the UE to update at least one of the one or more beamforming parameters in the beamforming calibration configuration

FIG. 8

USER-EQUIPMENT-REQUESTED BEAMFORMING CALIBRATION

FIELD OF THE DISCLOSURE

Aspects of the present disclosure generally relate to wireless communication and to techniques and apparatuses for beamforming calibration requests from a user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may detecting one or more trigger conditions. The method may include transmitting a beamforming calibration update request as a result of detecting the one or more trigger conditions. The method may include receiving one or more beamforming assistance signals in response to the beamforming calibration update request. The method may include updating at least one beamforming parameter of one or more beamforming parameters in a beamforming calibration configuration based, at least in part, on the one or more beamforming assistance signals.

Some aspects described herein relate to a method of wireless communication performed by a network node. The method may include receiving a beamforming calibration update request as a result of a UE detecting one or more trigger conditions associated with one or more beamforming parameters included in a beamforming calibration configuration. The method may include transmitting one or more beamforming assistance signals in response to the beamforming calibration update request, the one or more beamforming assistance signals including information for the UE to update at least one of the one or more beamforming parameters in the beamforming calibration configuration.

Some aspects described herein relate to a UE for wireless communication. The UE may include one or more memories and one or more processors coupled to the one or more memories. The one or more processors may be configured to detect one or more trigger conditions. The one or more processors may be configured to transmit a beamforming calibration update request as a result of detecting the one or more trigger conditions. The one or more processors may be configured to receive one or more beamforming assistance signals in response to the beamforming calibration update request. The one or more processors may be configured to update at least one beamforming parameter of one or more beamforming parameters in a beamforming calibration configuration based, at least in part, on the one or more beamforming assistance signals.

Some aspects described herein relate to a network node for wireless communication. The network node may include one or more memories and one or more processors coupled to the one or more memories. The one or more processors may be configured to receive a beamforming calibration update request as a result of a UE detecting one or more trigger conditions associated with one or more beamforming parameters included in a beamforming calibration configuration. The one or more processors may be configured to transmit one or more beamforming assistance signals in response to the beamforming calibration update request, the one or more beamforming assistance signals including information for the UE to update at least one of the one or more beamforming parameters in the beamforming calibration configuration.

Some aspects described herein relate to a non-transitory computer-readable medium that stores a set of instructions for wireless communication by a UE. The set of instructions, when executed by one or more processors of the UE, may cause the UE to detect one or more trigger conditions. The set of instructions, when executed by one or more processors of the UE, may cause the UE to transmit a beamforming calibration update request as a result of detecting the one or more trigger conditions. The set of instructions, when executed by one or more processors of the UE, may cause the UE to receive one or more beamforming assistance signals in response to the beamforming calibration update request. The set of instructions, when executed by one or more processors of the UE, may cause the UE to update at least one beamforming parameter of one or more beamforming parameters in a beamforming calibration configuration based, at least in part, on the one or more beamforming assistance signals.

Some aspects described herein relate to a non-transitory computer-readable medium that stores a set of instructions for wireless communication by a network node. The set of instructions, when executed by one or more processors of the network node, may cause the network node to receive a beamforming calibration update request as a result of a UE detecting one or more trigger conditions associated with one or more beamforming parameters included in a beamforming calibration configuration. The set of instructions, when executed by one or more processors of the network node, may cause the network node to transmit one or more beamforming assistance signals in response to the beamforming calibration update request, the one or more beamforming assistance signals including information for the UE to update at least one of the one or more beamforming parameters in the beamforming calibration configuration.

Some aspects described herein relate to an apparatus for wireless communication. The apparatus may include means for detecting one or more trigger conditions. The apparatus may include means for transmitting a beamforming calibration update request as a result of detecting the one or more trigger conditions. The apparatus may include means for receiving one or more beamforming assistance signals in response to the beamforming calibration update request. The apparatus may include means for updating at least one beamforming parameter of one or more beamforming parameters in a beamforming calibration configuration based, at least in part, on the one or more beamforming assistance signals.

Some aspects described herein relate to an apparatus for wireless communication. The apparatus may include means for receiving a beamforming calibration update request as a result of a UE detecting one or more trigger conditions associated with one or more beamforming parameters included in a beamforming calibration configuration. The apparatus may include means for transmitting one or more beamforming assistance signals in response to the beamforming calibration update request, the one or more beamforming assistance signals including information for the UE to update at least one of the one or more beamforming parameters in the beamforming calibration configuration.

Aspects generally include a method, apparatus, system, computer program product, non-transitory computer-readable medium, UE, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a UE, in accordance with the present disclosure.

FIG. 8 is a diagram illustrating an example process performed, for example, by a network node, in accordance with the present disclosure.

DETAILED DESCRIPTION

Figure 1:
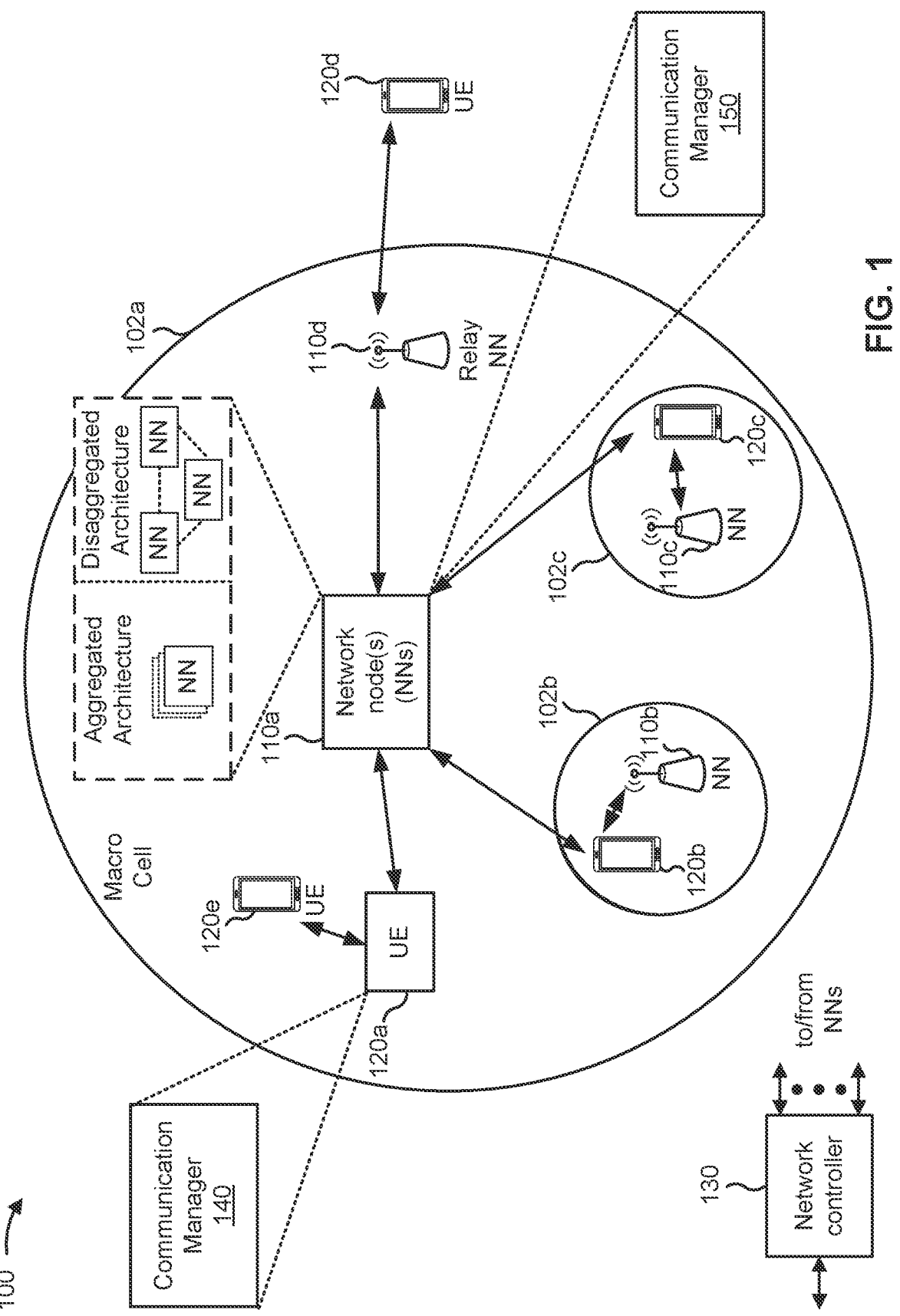
FIG. 1 is a diagram illustrating an example of a wireless network, in accordance with the present disclosure.

Beamforming calibration is a wireless communication technique that allows a user equipment (UE) to establish a strong connection with a network node on both uplink and downlink. In general, beamforming works by focusing the radio signals from a set of antennas of the network node and the UE in specific directions toward one another. Improper beamforming calibration can lead to several issues that can impact the overall network performance and user experience. One such issue involves the misalignment of the radiation pattern between downlink and uplink, which may cause the main lobe of the signal to be directed away from the intended receiver, resulting in reduced signal strength and, consequently, degraded communication quality. This could manifest as slower internet speeds, higher latency, or dropped connections, diminishing the network's ability to provide the expected high-speed and low-latency performance. Another issue that may arise from inadequate beamforming calibration is increased interference between user devices. When the radiation patterns are not accurately shaped and directed, the side lobes may cause unwanted interference to nearby receivers, effectively reducing the network capacity and spectral efficiency. This can lead to a suboptimal allocation of resources and an overall decline in network performance.

Various aspects relate generally to on-demand beamforming calibration. Some aspects more specifically relate to configuring a UE to request an updated beamforming calibration in certain circumstances, such as when the UE determines that its initial calibration may be inadequate. In some examples, the UE detects one or more trigger conditions; transmits a beamforming calibration update request as a result of detecting the one or more trigger conditions; receives one or more beamforming assistance signals in response to the beamforming calibration update request; and updates at least one beamforming parameter of one or more beamforming parameters in a beamforming calibration configuration based, at least in part, on the one or more beamforming assistance signals. In some examples, a network node receives a beamforming calibration update request as a result of a UE detecting one or more trigger conditions associated with one or more beamforming parameters included in a beamforming calibration configuration; and transmits one or more beamforming assistance signals in response to the beamforming calibration update request. The one or more beamforming assistance signals include information for the UE to update at least one of the one or more beamforming parameters in the beamforming calibration configuration.

Particular aspects of the subject matter described in this disclosure can be implemented to realize one or more of the following potential advantages. In some examples, by updating at least one of the one or more beamforming parameters in the beamforming calibration configuration based, at least in part, on the one or more beamforming assistance signals, the described techniques can be used to apply a beamforming calibration that is tailored to the particular operating environment of the UE, which can result in improved network performance and user experience. In some examples, by transmitting one or more beamforming assistance signals in response to the beamforming calibration update request, the described techniques can be used to help the UE communicate more efficiently while minimizing latency, interference, and other issues caused by the UE using an inadequate beamforming calibration.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may store a beamforming calibration configuration including one or more beamforming parameters; detect one or more trigger conditions; transmit a beamforming calibration update request as a result of detecting the one or more trigger conditions; receive one or more beamforming assistance signals in response to the beamforming calibration update request; and update at least one of the one or more beamforming parameters in the beamforming calibration configuration based, at least in part, on the one or more beamforming assistance signals. Additionally, or alternatively, the communication manager 140 may perform one or more other operations described herein.

In some aspects, the network node 110 may include a communication manager 150. As described in more detail elsewhere herein, the communication manager 150 may receive a beamforming calibration update request as a result of a UE detecting one or more trigger conditions associated with one or more beamforming parameters included in a beamforming calibration configuration; and transmit one or more beamforming assistance signals in response to the beamforming calibration update request, the one or more beamforming assistance signals including information for the UE to update at least one of the one or more beamforming parameters in the beamforming calibration configuration. Additionally, or alternatively, the communication manager 150 may perform one or more other operations described herein.

As indicated above, FIG. 1 is provided as an example. Other examples may differ from what is described with regard to FIG. 1.

Figure 2:
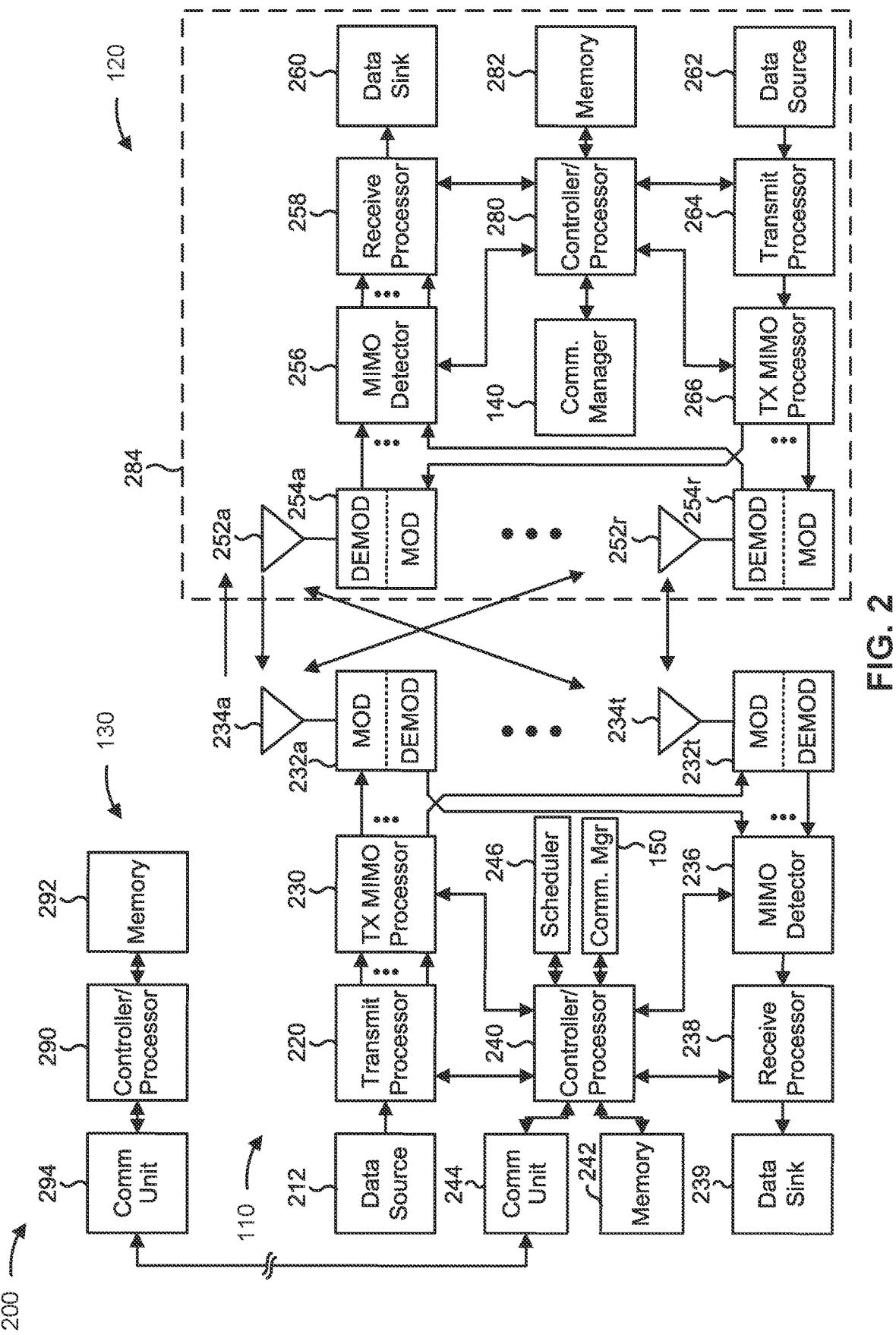
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the network node 110, the controller/processor 280 of the UE 120, and/or any other component(s) of FIG. 2 may perform one or more techniques associated with a UE-requested beam calibration, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for detecting one or more trigger conditions (e.g., using communication manager 140, controller/processor 280, or the like); means for transmitting a beamforming calibration update request as a result of detecting the one or more trigger conditions (e.g., using controller/processor 280, memory 282, or the like); means for receiving one or more beamforming assistance signals in response to the beamforming calibration update request (e.g., using antenna 252, modem 254, MIMO detector 256, receive processor 258, controller/processor 280, memory 282, or the like); and/or means for updating at least one beamforming parameter of one or more beamforming parameters in a beamforming calibration configuration based, at least in part, on the one or more beamforming assistance signals (e.g., using communication manager 140, controller/processor 280, or the like). The means for the UE 120 to perform operations described herein may alternatively or additionally include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving a beamforming calibration update request as a result of a UE detecting one or more trigger conditions associated with one or more beamforming parameters included in a beamforming calibration configuration (e.g., using antenna 234, modem 232, MIMO detector 236, receive processor 238, controller/processor 240, memory 242, or the like); and/or means for transmitting one or more beamforming assistance signals in response to the beamforming calibration update request, the one or more beamforming assistance signals including information for the UE to update at least one of the one or more beamforming parameters in the beamforming calibration configuration (e.g., using controller/processor 240, transmit processor 220, TX MIMO processor 230, modem 232, antenna 234, memory 242, or the like). The means for the network node 110 to perform operations described herein may alternatively or additionally include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
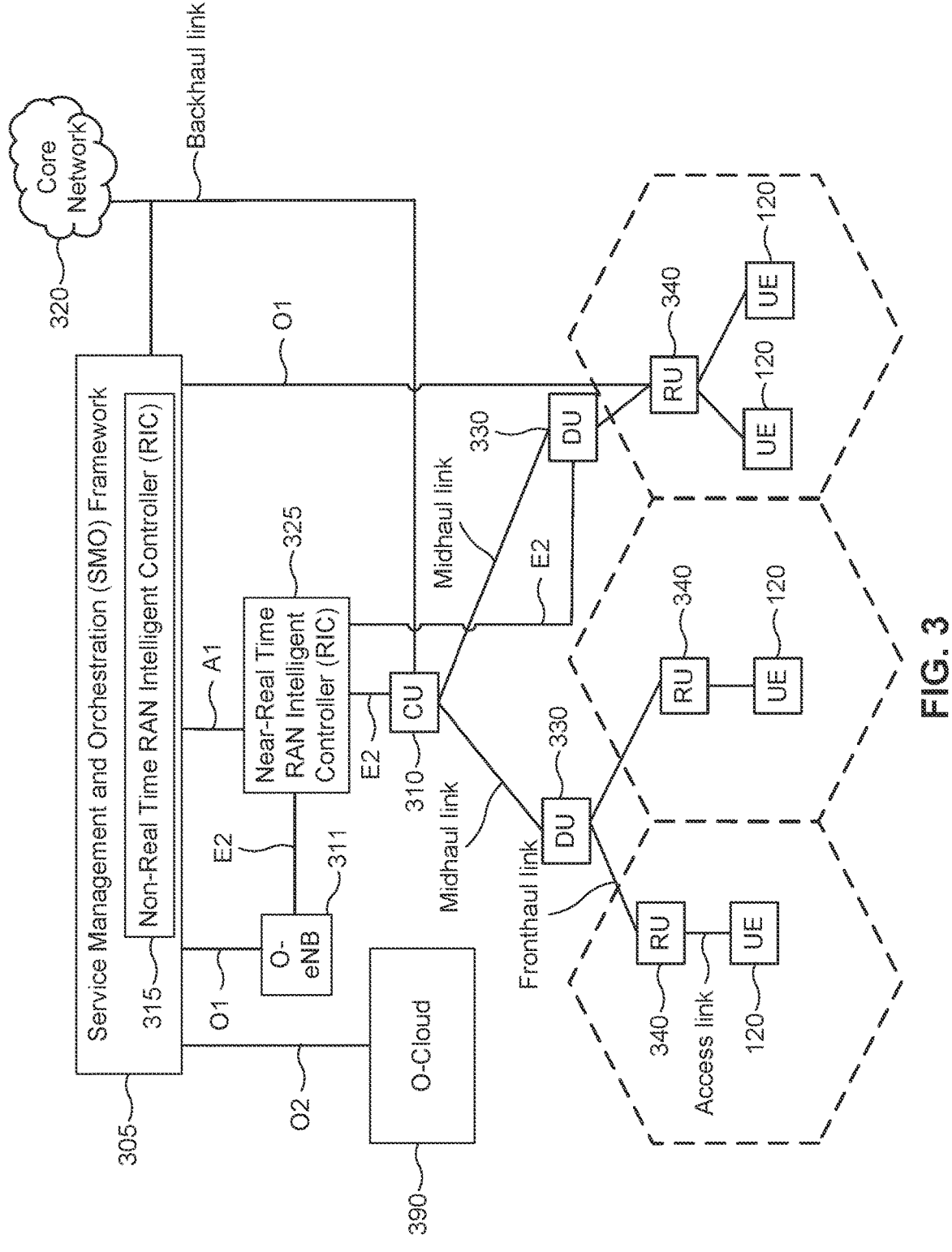
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
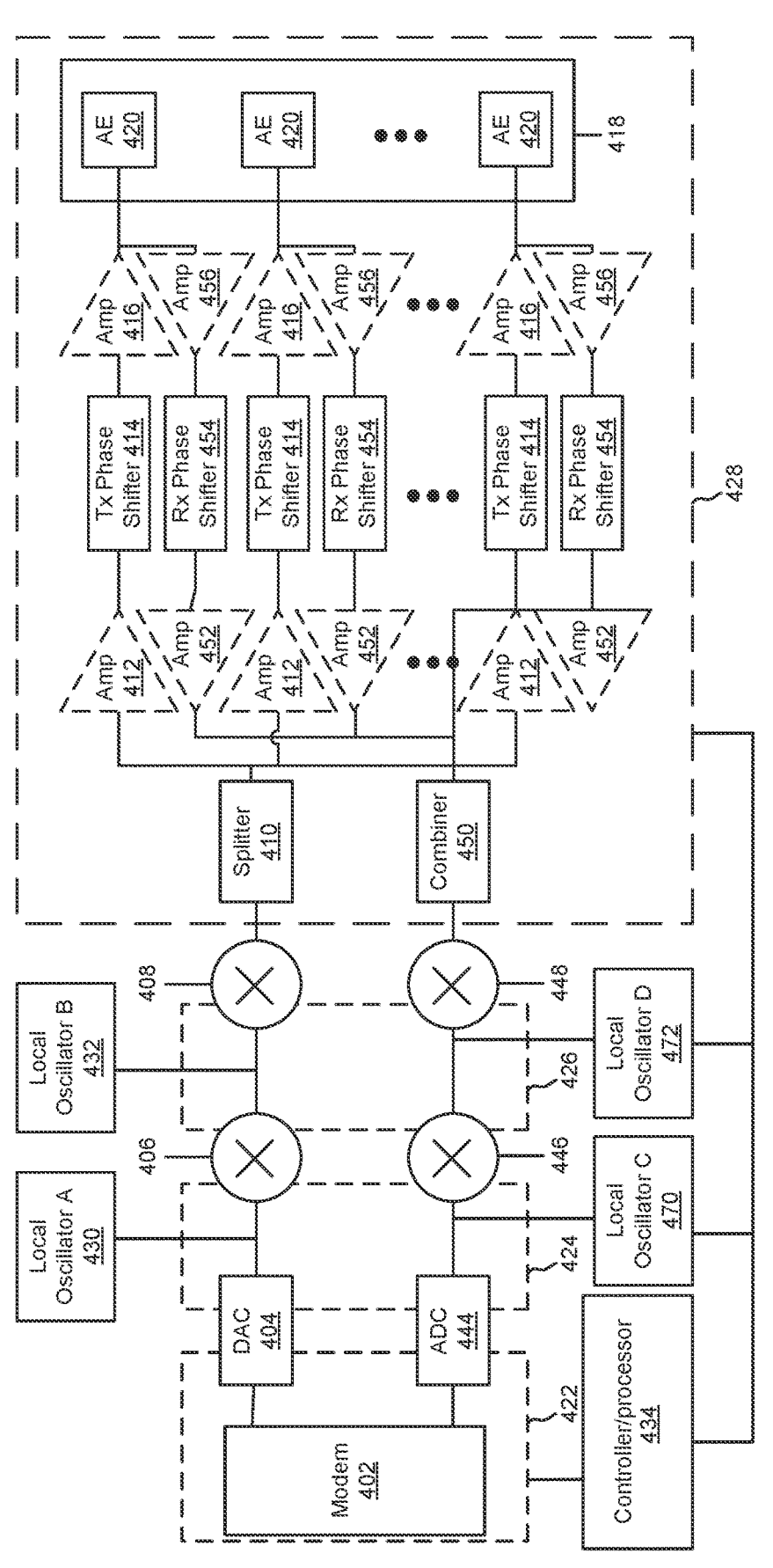
FIG. 4 is a diagram illustrating an example beamforming architecture that supports beamforming for millimeter wave communications, in accordance with the present disclosure.

FIG. 4 is a diagram illustrating an example beamforming architecture 400 that supports beamforming for millimeter wave (mmW) communications, in accordance with the present disclosure. In some aspects, architecture 400 may implement aspects of wireless network 100. In some aspects, architecture 400 may be implemented in a transmitting device (e.g., a first wireless communication device, UE (such as UE 120), or network node (such as network node 110)) and/or a receiving device (e.g., a second wireless communication device, UE (such as UE 120), or network node (such as network node 110)), as described herein.

Broadly, FIG. 4 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420. In some examples, the modem 402 may be one or more of the modems 232 or modems 254 described in connection with FIG. 2.

Transmission lines or other waveguides, wires, and/or traces are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog RF signals travel or are processed. The architecture also includes a local oscillator A 430, a local oscillator B 432, and a controller/processor 434. In some aspects, controller/processor 434 corresponds to controller/processor 240 of the network node 110 described above in connection with FIG. 2 and/or controller/processor 280 of the UE 120 described above in connection with FIG. 2.

Each of the antenna elements 420 may include one or more sub-elements for radiating or receiving RF signals. For example, a single antenna element 420 may include a first sub-element cross-polarized with a second sub-element that can be used to independently transmit cross-polarized signals. The antenna elements 420 may include patch antennas, dipole antennas, or other types of antennas arranged in a linear pattern, a two dimensional pattern, or another pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the controller/processor 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 416 are present. In some aspects, neither the first amplifier 412 nor the second amplifier 416 is present. In some aspects, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or the controller/processor 434) to provide independent control of the gain for each antenna element 420. For example, the modem 402 and/or the controller/processor 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or the same amount of phase shift or some other configuration. The modem 402 and/or the controller/processor 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (e.g., for time division duplex (TDD) operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the controller/processor 434 may have at least one control line connected to each of the phase shifters 454 and which may be used to configure the phase shifters 454 to provide a desired amount of phase shift or phase offset between antenna elements 420 to enable reception via one or more Rx beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (e.g., not connected to a power source), which may result in some insertion loss. The combiner 450 may be an active combiner (e.g., connected to a power source), which may result in some signal gain. When combiner 450 is an active combiner, it may provide a different (e.g., configurable) amount of gain for each input signal so that the input signals have the same magnitude when they are combined. When combiner 450 is an active combiner, the combiner 450 may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to digital signals. The digital signals output from ADC 444 are input to modem 402 for baseband processing, such as decoding, de-interleaving, or similar operations.

The architecture 400 is given by way of example only to illustrate an architecture for transmitting and/or receiving signals. In some cases, the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (e.g., for each antenna element chain) within the second mixer 408, and the local oscillator B 432 may supply different local oscillator signals (with different phase offsets) to each IF to RF mixer.

The modem 402 and/or the controller/processor 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other. The controller/processor 434 may be located partially or fully within one or more other components of the architecture 400. For example, the controller/processor 434 may be located within the modem 402 in some aspects.

One or more of the components discussed above with reference to FIG. 4 may be calibrated via a beamforming calibration configuration that includes one or more beamforming parameters. In some aspects, the beamforming calibration configuration may be stored in one or more memories accessible to the controller/processor 434. In some aspects, the beamforming parameters may be stored in a look-up table stored in the one or more memories. The beamforming parameters may include a phase shift beam weight, antenna array configuration, beam steering angle, channel state information (CSI), power allocation, signal-to-interference-plus-noise ratio (SINR), frequency response, temperature and environmental effects, hardware impairments (e.g., phase noise, oscillator instability, and amplifier non-linearities), and/or a combination thereof, among other examples. In some aspects, each of the beamforming parameters included in the beamforming calibration configuration may be associated with one or more frequencies, one or more temperature values, and/or a combination thereof, among other examples.

As indicated above, FIG. 4 is provided as an example. Other examples may differ from what is described with regard to FIG. 4.

Figure 5:
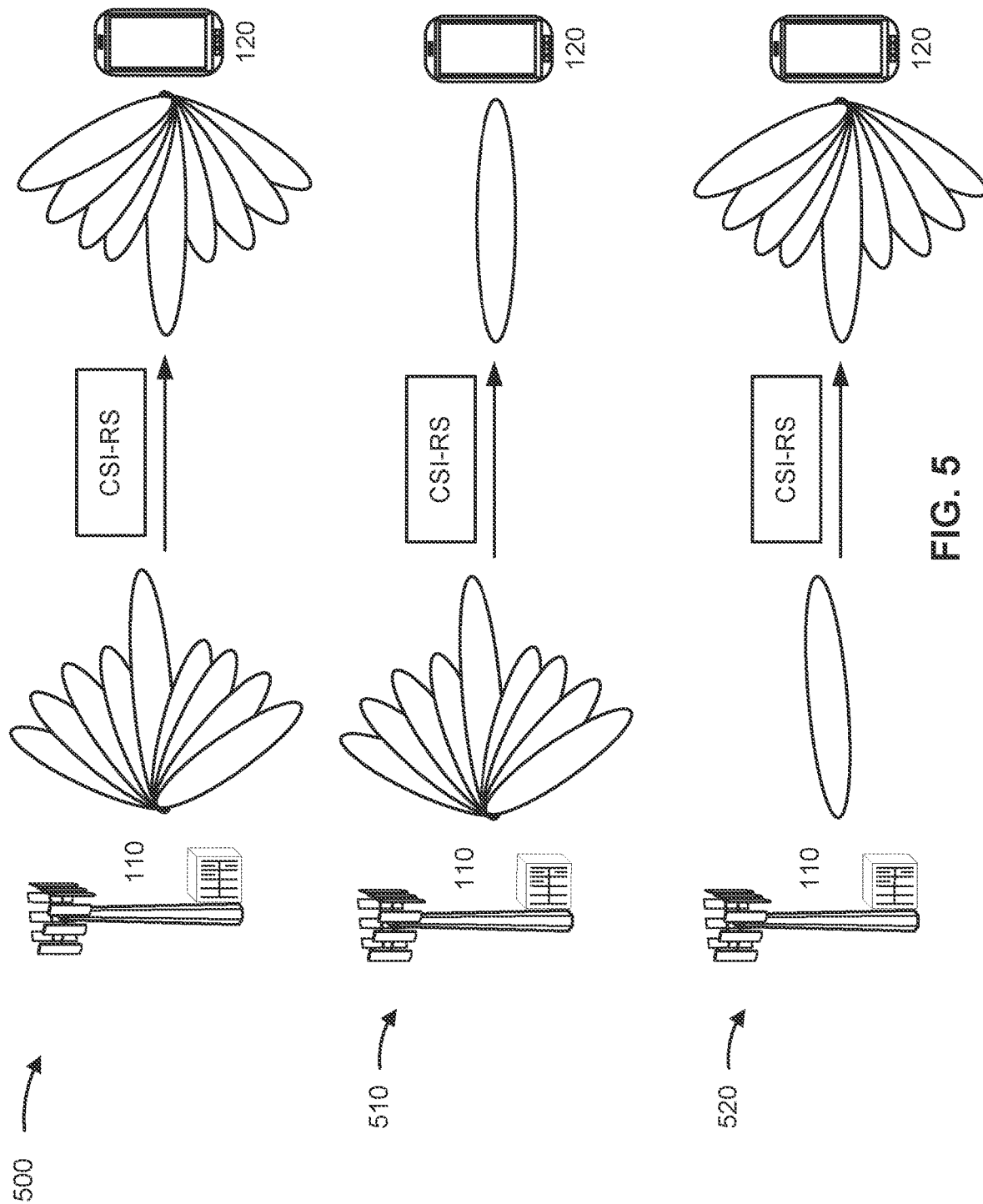
FIG. 5 is a diagram illustrating examples of channel state information reference signal beam management procedures, in accordance with the present disclosure.

FIG. 5 is a diagram illustrating examples 500, 510, and 520 of CSI reference signal (CSI-RS) beam management procedures, in accordance with the present disclosure. As shown in FIG. 5, examples 500, 510, and 520 include a UE 120 in communication with a network node 110 in a wireless network (e.g., wireless network 100). However, the devices shown in FIG. 5 are provided as examples, and the wireless network may support communication and beam management between other devices (e.g., between a UE 120 and a network node 110 or TRP, between a mobile termination node and a control node, between an IAB child node and an IAB parent node, and/or between a scheduled node and a scheduling node). In some aspects, the UE 120 and the network node 110 may be in a connected state (e.g., an RRC connected state).

As shown in FIG. 5, example 500 may include a network node 110 (e.g., one or more network node devices such as an RU, a DU, and/or a CU, among other examples) and a UE 120 communicating to perform beam management using CSI-RSs. Example 500 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 5 and example 500, CSI-RSs may be configured to be transmitted from the network node 110 to the UE 120. The CSI-RSs may be configured to be periodic (e.g., using RRC signaling), semi-persistent (e.g., using MAC control element (MAC-CE) signaling), and/or aperiodic (e.g., using downlink control information (DCI)).

The first beam management procedure may include the network node 110 performing beam sweeping over multiple Tx beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same reference signal (RS) resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 500 has been described in connection with CSI-RSs, the first beam management process may also use synchronization signal blocks (SSBs) for beam management in a similar manner as described above.

As shown in FIG. 5, example 510 may include a network node 110 and a UE 120 communicating to perform beam management using CSI-RSs. Example 510 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 5 and example 510, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 5, example 520 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 5 and example 520, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

The UE 120 may perform the beam management procedures discussed with reference to FIG. 5 according to the beamforming calibration configuration. For example, based, at least in part, on the beamforming calibration configuration, the UE 120 may be configured to select the best beam for communications with the network node 110. In some aspects, such as upon the detection of a trigger condition, the UE 120 may be further configured to request an update, from the network node 110, to the beamforming calibration configuration. The trigger conditions may be based, at least in part, on physical or operational characteristics of the network node 110, particularly the physical or operational characteristics that deviate from those used to calibrate the beam management procedure. Examples of trigger conditions may include receiving an indication of a bandwidth, a number of antenna elements in an antenna array associated with the network node 110, a scan range of the antenna array, a phase shifter precision, a discrepancy between an intended steering direction and an actual steering direction, a type of beam weight, and/or a combination thereof, among other examples. An example process of updating the beamforming calibration configuration is discussed in greater detail below with respect to FIG. 6.

As indicated above, FIG. 5 is provided as an example of beam management procedures. Other examples of beam management procedures may differ from what is described with respect to FIG. 5. For example, the UE 120 and the network node 110 may perform the third beam management procedure before performing the second beam management procedure, and/or the UE 120 and the network node 110 may perform a similar beam management procedure to select a UE transmit beam.

Figure 6:
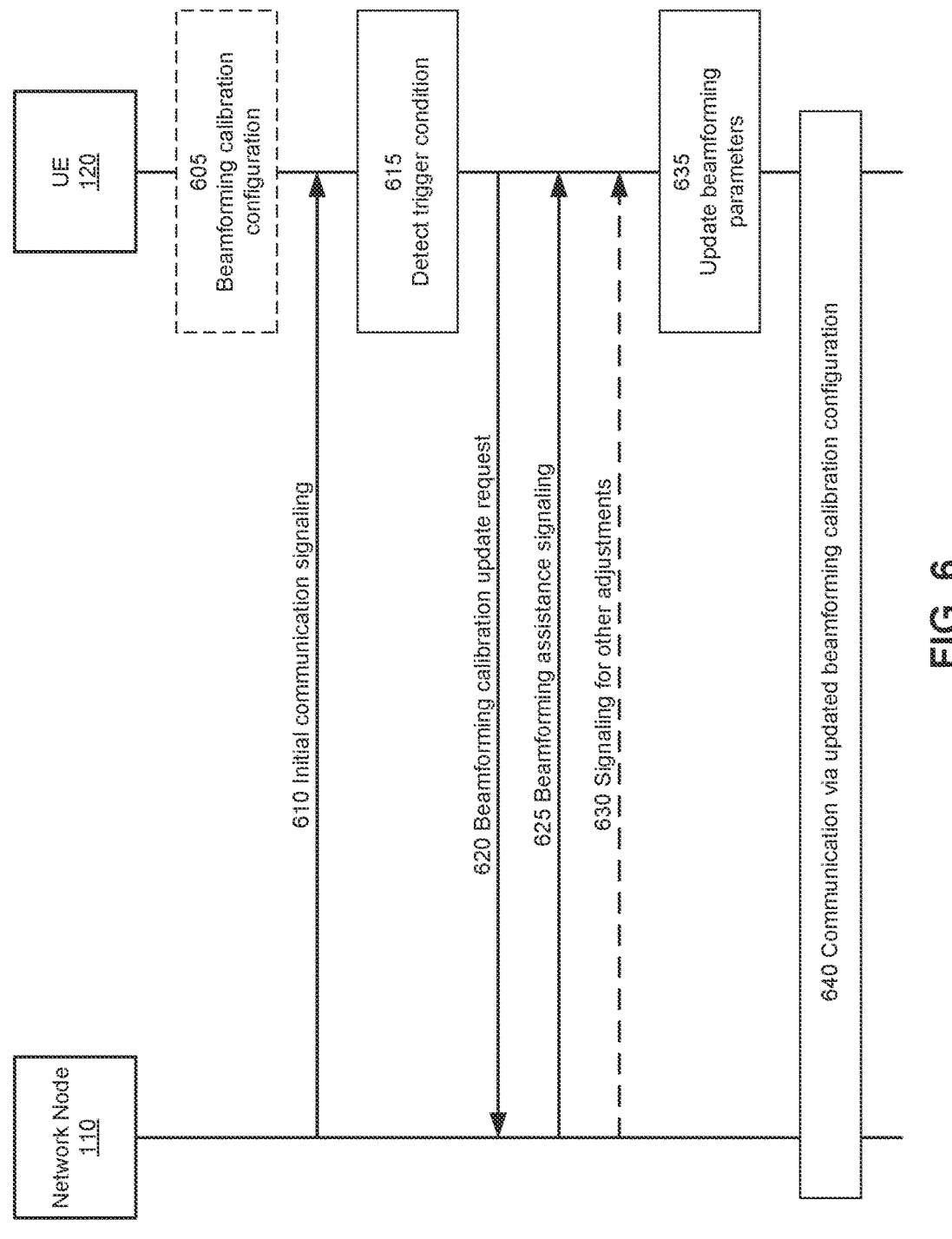
FIG. 6 is a diagram illustrating an example associated with UE-requested beamforming calibration updates, in accordance with the present disclosure.

FIG. 6 is a diagram illustrating an example 600 associated with UE-requested beamforming calibration updates, in accordance with the present disclosure. As shown in FIG. 6, a network node 110 and a UE 120 may communicate with one another.

As shown by reference number 605, the UE 120 may store a beam calibration configuration. The beam calibration configuration may include the one or more beamforming parameters discussed above with reference to FIG. 4. The beam calibration configuration may, in some instances, be stored in one or more memories accessible to the controller/processor 434 of the UE 120. The beam calibration configuration, including the beamforming parameters, may be stored in a look-up table in the one or more memories of the UE 120 prior to the UE 120 communicating with the network node 110. For example, the beam calibration configuration may include one or more factory settings.

As shown by reference number 610, the network node 110 may transmit, and the UE 120 may receive, initial communication signaling. The initial communication signaling may include signaling associated with establishing initial communication with the UE 120. The "initial communication" need not be the first communication between the UE 120 and the network node 110. For example, the initial communication signaling may occur after the UE 120 and network node 110 have ceased a previous communication instance. The initial communication signaling may include SSB signaling, system information block (SIB) signaling, RRC messages, and/or a combination thereof, among other examples. The initial communication signaling may provide the UE 120 with information, such as physical and/or operational characteristics discussed above with respect to FIG. 5, associated with the network node 110.

As shown by reference number 615, the UE 120 may detect one or more trigger conditions. The trigger conditions may include conditions that suggest that the beamforming calibration configuration may be inadequate for communication with the network node 110. For example, the trigger conditions may refer to conditions that differ from those under which the beamforming calibration configuration was developed. As discussed above with respect to FIG. 5, the trigger conditions may include receiving an indication of a bandwidth, a number of antenna elements in an antenna array associated with the network node 110 (which may be dynamically updated), a scan range of the antenna array (which may be dynamically updated), a phase shifter precision (which may be dynamically configured), a discrepancy between an intended steering direction and an actual steering direction, a type of beam weight determined by a directionality of a steered beam pattern, and/or a combination thereof, among other examples. As used herein, the term "dynamically" may mean "occasionally," or "periodically." In some instances, the term "dynamic" may indicate that the update or configuration occurs during a period of time after the UE 120 and the network node 110 begin communicating with one another. With respect to the type of beam weight determined by the directionality of the steered beam pattern and associated array gain properties, some beam weights are directional with a single dominant beam pattern peak, and some beams have multiple comparable peaks (that is, peaks within a threshold signal strength) in the beam pattern behavior. These sets of beams can be treated as multi-beams or derived from the use of adaptive beam weights (in contrast to beams with a single dominant beam pattern peak, the beam weights of which may be derived from the use of static beam weights stored in the RF integrated circuit (RFIC) memory). The trigger conditions may be detected, by the UE 120, based, at least in part, on information output by the network node 110 via, for example, the initial communication signaling.

As shown by reference number 620, the UE 120 may transmit, and the network node 110 may receive, a beamforming calibration update request. In some aspects, the beamforming calibration update request is transmitted as a result of the UE 120 detecting one or more trigger conditions. The beamforming calibration update request may include a request for assistance, from the network node 110, that the UE 120 may use to update the beamforming parameters of the beamforming calibration configuration. In some aspects, the beamforming calibration update request may be transmitted from the UE 120 to the network node 110 via an uplink control information (UCI) signal, an RRC signal, a MAC-CE signal, and/or a combination thereof, among other examples. In some aspects, the beamforming calibration update request is transmitted via separately formulated or standardized signaling or messaging indicating an insufficient beamforming calibration.

As shown by reference number 625, the network node 110 may transmit, and the UE 120 may receive, beamforming assistance signaling. In some aspects, the network node 110 may transmit, and the UE 120 may receive, the beamforming assistance signaling in response to the network node 110 receiving the beamforming calibration update request. In some aspects, the beamforming assistance signaling May include one or more requests for a mission-mode calibration signal (e.g., a signal including one or more requests for updated beamforming parameters related to the communication between the UE 120 and the network node 110), one or more on-demand reference signals (e.g., reference signals that the UE 120 can use to calibrate or otherwise update the beamforming parameters), a feedback message (e.g., a message with information that the UE 120 can use to calibrate or otherwise update the beamforming parameters), and/or a combination thereof, among other examples.

As shown by reference number 630, the network node 110 may transmit, and the UE 120 may receive, signaling for other adjustments to be implemented by the UE 120. For example, the network node 110 may transmit, and the UE 120 may receive, an adjusted link budget as a result of the beamforming calibration update request. The link budget may include information that the UE 120 can use to calculate or otherwise determine various factors associated with beamforming. For example, the link budget may include factors such as a transmit power, a transmitter antenna gain, path loss, interference and noise, a receiver antenna gain, a receiver sensitivity, and/or a combination thereof, among other examples. The adjusted link budget may include a modified version of one or more of those factors. In another example, the network node 110 may transmit, and the UE 120 may receive, an adjusted MCS, performance parameter, and/or a combination thereof, among other examples.

As shown by reference number 635, the UE 120 may update at least one of the beamforming parameters in the beamforming calibration configuration based, at least in part, on the beamforming assistance signaling transmitted by the network node 110. In some aspects, updating at least one of the beamforming parameters may include updating the look-up table stored in one or more memories of the UE 120.

As shown by reference number 640, after updating one or more of the beamforming parameters, the UE 120 may apply an updated beamforming calibration configuration for communication with the network node 110. With the updated beamforming calibration configuration, the UE 120 may apply beamforming parameters that have been calibrated or otherwise updated in accordance with the physical and/or operational characteristics of the network node 110, particularly if those characteristics differ from the circumstances under which the initial beamforming calibration configuration was developed. As a result, the UE 120 may provide improved network performance and user experience. The network 110 may experience reduced latency, interference, and potentially other issues.

As indicated above, FIG. 6 is provided as an example. Other examples may differ from what is described with respect to FIG. 6.

FIG. 7 is a diagram illustrating an example process 700 performed, for example, by a UE, in accordance with the present disclosure. Example process 700 is an example where the UE (e.g., UE 120) performs operations associated with UE-requested beamforming calibration.

As shown in FIG. 7, in some aspects, process 700 may include detecting one or more trigger conditions (block 710). For example, the UE (e.g., using communication manager 140 and/or communication manager, depicted in FIG. 9) may detect one or more trigger conditions, as described above, for example, with reference to FIGS. 4, 5, and/or 6.

As further shown in FIG. 7, in some aspects, process 700 may include transmitting a beamforming calibration update request as a result of detecting the one or more trigger conditions (block 720). For example, the UE (e.g., using communication manager 140 and/or transmission component 904, depicted in FIG. 9) may transmit a beamforming calibration update request as a result of detecting the one or more trigger conditions, as described above, for example, with reference to FIGS. 4, 5, and/or 6.

As further shown in FIG. 7, in some aspects, process 700 may include receiving one or more beamforming assistance signals in response to the beamforming calibration update request (block 730). For example, the UE (e.g., using communication manager 140 and/or reception component 902, depicted in FIG. 9) may receive one or more beamforming assistance signals in response to the beamforming calibration update request, as described above, for example, with reference to FIGS. 4, 5, and/or 6.

As further shown in FIG. 7, in some aspects, process 700 may include updating at least one beamforming parameter of one or more beamforming parameters in a beamforming calibration configuration based, at least in part, on the one or more beamforming assistance signals (block 740). For example, the UE (e.g., using communication manager 140 and/or communication manager 906, depicted in FIG. 9) may update at least one beamforming parameter of one or more beamforming parameters in a beamforming calibration configuration based, at least in part, on the one or more beamforming assistance signals, as described above, for example, with reference to FIGS. 4, 5, and/or 6.

Process 700 may include additional aspects, such as any single aspect or any combination of aspects described below and/or in connection with one or more other processes described elsewhere herein.

In a first aspect, storing the beamforming calibration configuration including the one or more beamforming parameters includes storing the beamforming calibration configuration including the one or more beamforming parameters in a look-up table.

In a second aspect, alone or in combination with the first aspect, updating the at least one of the one or more beamforming parameters in the beamforming calibration configuration based, at least in part, on the one or more beamforming assistance signals includes updating the at least one of the one or more beamforming parameters in the look-up table based, at least in part, on the one or more beamforming assistance signals.

In a third aspect, alone or in combination with one or more of the first and second aspects, transmitting the beamforming calibration update request includes transmitting the beamforming calibration update request via a UCI signal, an RRC signal, or a MAC-CE signal.

In a fourth aspect, alone or in combination with one or more of the first through third aspects, the beamforming calibration update request is transmitted via separately formulated or standardized signaling or messaging indicating an insufficient beamforming calibration.

In a fifth aspect, alone or in combination with one or more of the first through fourth aspects, the one or more trigger conditions are based, at least in part, on a number of antenna elements in an antenna array, a scan range associated with the antenna array, a phase shifter precision, a discrepancy between an intended steering direction and an actual steering direction, a type of beam weight determined by a directionality of a steered beam pattern, or any combination thereof.

In a sixth aspect, alone or in combination with one or more of the first through fifth aspects, detecting the one or more trigger conditions includes receiving an update or configuration associated with one or more of the number of antenna elements in the antenna array, the scan range associated with the antenna array, the phase shifter precision, or any combination thereof.

In a seventh aspect, alone or in combination with one or more of the first through sixth aspects, the one or more beamforming assistance signals include one or more requests for a mission-mode calibration signal, one or more requests for on-demand reference signals, a feedback message, or any combination thereof.

In an eighth aspect, alone or in combination with one or more of the first through seventh aspects, process 700 includes receiving an adjusted link budget as a result of transmitting the beamforming calibration update request.

In a ninth aspect, alone or in combination with one or more of the first through eighth aspects, process 700 includes receiving an adjusted MCS, a performance parameter, or any combination thereof, as a result of transmitting the beamforming calibration update request.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a network node, in accordance with the present disclosure. Example process 800 is an example where the network node (e.g., network node 110) performs operations associated with UE-requested beamforming calibration.

As shown in FIG. 8, in some aspects, process 800 may include receiving a beamforming calibration update request as a result of a UE detecting one or more trigger conditions associated with one or more beamforming parameters included in a beamforming calibration configuration (block 810). For example, the network node (e.g., using communication manager 150 and/or reception component 1002, depicted in FIG. 10) may receive a beamforming calibration update request as a result of a UE detecting one or more trigger conditions associated with one or more beamforming parameters included in a beamforming calibration configuration, as described above, for example, with reference to FIGS. 4, 5, and/or 6.

As further shown in FIG. 8, in some aspects, process 800 may include transmitting one or more beamforming assistance signals in response to the beamforming calibration update request, the one or more beamforming assistance signals including information for the UE to update at least one of the one or more beamforming parameters in the beamforming calibration configuration (block 820). For example, the network node (e.g., using communication manager 150 and/or transmission component 1004, depicted in FIG. 10) may transmit one or more beamforming assistance signals in response to the beamforming calibration update request, the one or more beamforming assistance signals including information for the UE to update at least one of the one or more beamforming parameters in the beamforming calibration configuration, as described above, for example, with reference to FIGS. 4, 5, and/or 6.

Process 800 may include additional aspects, such as any single aspect or any combination of aspects described below and/or in connection with one or more other processes described elsewhere herein.

In a first aspect, receiving the beamforming calibration update request includes receiving the beamforming calibration update request via a UCI signal, an RRC signal, or a MAC-CE signal.

In a second aspect, alone or in combination with the first aspect, the beamforming calibration update request is transmitted via separately formulated or standardized signaling or messaging indicating an insufficient beamforming calibration.

In a third aspect, alone or in combination with one or more of the first and second aspects, the one or more trigger conditions are based, at least in part, on a number of antenna elements in an antenna array, a scan range associated with the antenna array, a phase shifter precision, a discrepancy between an intended steering direction and an actual steering direction, a type of beam weight determined by a directionality of a steered beam pattern, or any combination thereof.

In a fourth aspect, alone or in combination with one or more of the first through third aspects, one or more of the number of antenna elements in the antenna array is dynamically updated, the scan range associated with the antenna array is dynamically updated, the phase shifter precision is dynamically configured, or any combination thereof.

In a fifth aspect, alone or in combination with one or more of the first through fourth aspects, the one or more beamforming assistance signals include one or more requests for a mission-mode calibration signal, one or more requests for on-demand reference signals, a feedback message, or any combination thereof.

In a sixth aspect, alone or in combination with one or more of the first through fifth aspects, process 800 includes transmitting an adjusted link budget as a result of receiving the beamforming calibration update request.

In a seventh aspect, alone or in combination with one or more of the first through sixth aspects, process 800 includes transmitting an adjusted MCS, a performance parameter, or any combination thereof, as a result of receiving the beamforming calibration update request.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
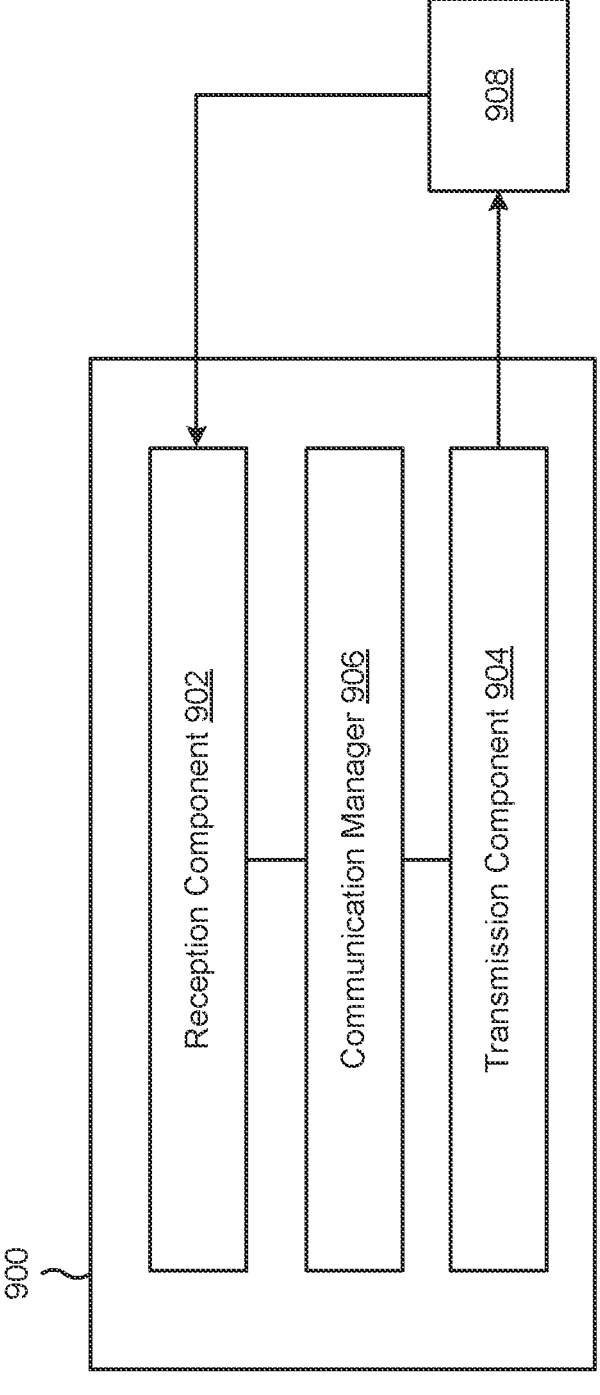
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The communication manager 906 may detect one or more trigger conditions. The transmission component 904 may transmit a beamforming calibration update request as a result of detecting the one or more trigger conditions. The reception component 902 may receive one or more beamforming assistance signals in response to the beamforming calibration update request. The communication manager 906 may update at least one beamforming parameter of one or more beamforming parameters in a beamforming calibration configuration based, at least in part, on the one or more beamforming assistance signals.

The communication manager 906 may store one or more beamforming parameters in a look-up table. The communication manager 906 may update the one or more beamforming parameters stored in the look-up table.

The reception component 902 may receive an adjusted link budget as a result of transmitting the beamforming calibration update request. The reception component 902 may receive an adjusted MCS, a performance parameter, or any combination thereof, as a result of transmitting the beamforming calibration update request.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
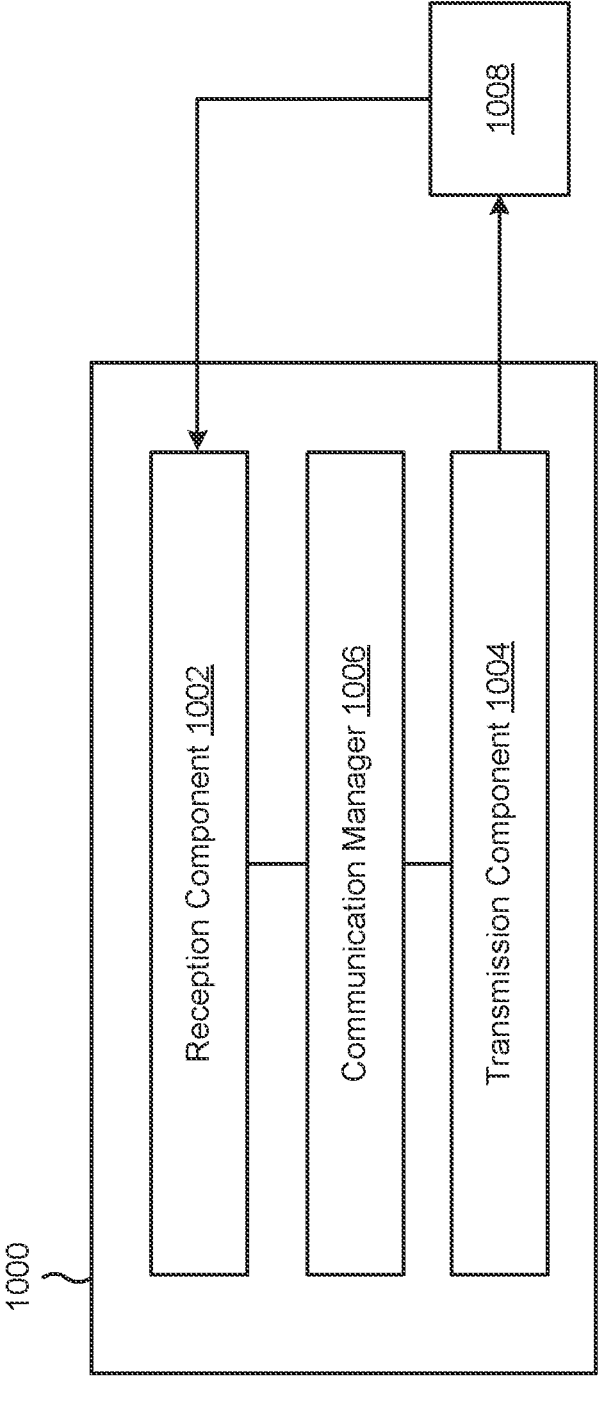
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive a beamforming calibration update request as a result of a UE detecting one or more trigger conditions associated with one or more beamforming parameters included in a beamforming calibration configuration. The transmission component 1004 may transmit one or more beamforming assistance signals in response to the beamforming calibration update request, the one or more beamforming assistance signals including information for the UE to update at least one of the one or more beamforming parameters in the beamforming calibration configuration.

The transmission component 1004 may transmit an adjusted link budget as a result of receiving the beamforming calibration update request. The transmission component 1004 may transmit an adjusted MCS, a performance parameter, or any combination thereof, as a result of receiving the beamforming calibration update request.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: detecting one or more trigger conditions; transmitting a beamforming calibration update request as a result of detecting the one or more trigger conditions; receiving one or more beamforming assistance signals in response to the beamforming calibration update request; and updating at least one beamforming parameter of one or more beamforming parameters in a beamforming calibration configuration based, at least in part, on the one or more beamforming assistance signals.

Aspect 2: The method of Aspect 1, further comprising storing the beamforming calibration configuration including the one or more beamforming parameters.

Aspect 3: The method of Aspect 2, wherein storing the beamforming calibration configuration includes storing the one or more beamforming parameters in a look-up table; and wherein updating the at least one of the one or more beamforming parameters in the beamforming calibration includes updating the at least one of the one or more beamforming parameters in the look-up table.

Aspect 4: The method of any of Aspects 1-3, wherein transmitting the beamforming calibration update request includes transmitting the beamforming calibration update request via a UCI signal, an RRC signal, or a MAC-CE signal.

Aspect 5: The method of any of Aspects 1-4, wherein the beamforming calibration update request is transmitted via separately formulated or standardized signaling or messaging indicating an insufficient beamforming calibration.

Aspect 6: The method of any of Aspects 1-5, wherein the one or more trigger conditions are based, at least in part, on a number of antenna elements in an antenna array, a scan range associated with the antenna array, a phase shifter precision, a discrepancy between an intended steering direction and an actual steering direction, a type of beam weight determined by a directionality of a steered beam pattern, or any combination thereof.

Aspect 7: The method of Aspect 6, wherein detecting the one or more trigger conditions includes receiving an update or configuration associated with one or more of the number of antenna elements in the antenna array, the scan range associated with the antenna array, the phase shifter precision, or any combination thereof.

Aspect 8: The method of any of Aspects 1-7, wherein the one or more beamforming assistance signals include one or more requests for a mission-mode calibration signal, one or more requests for on-demand reference signals, a feedback message, or any combination thereof.

Aspect 9: The method of any of Aspects 1-8, further comprising receiving an adjusted link budget as a result of transmitting the beamforming calibration update request.

Aspect 10: The method of any of Aspects 1-9, further comprising receiving an adjusted MCS, a performance parameter, or any combination thereof, as a result of transmitting the beamforming calibration update request.

Aspect 11: A method of wireless communication performed by a network node, comprising: receiving a beamforming calibration update request as a result of a UE detecting one or more trigger conditions associated with one or more beamforming parameters included in a beamforming calibration configuration; and transmitting one or more beamforming assistance signals in response to the beamforming calibration update request, the one or more beamforming assistance signals including information for the UE to update at least one of the one or more beamforming parameters in the beamforming calibration configuration.

Aspect 12: The method of Aspect 11, wherein receiving the beamforming calibration update request includes receiving the beamforming calibration update request via a UCI signal, an RRC signal, or a MAC-CE signal.

Aspect 13: The method of any of Aspects 11-12, wherein the beamforming calibration update request is transmitted via separately formulated or standardized signaling or messaging indicating an insufficient beamforming calibration.

Aspect 14: The method of any of Aspects 11-13, wherein the one or more trigger conditions are based, at least in part, on a number of antenna elements in an antenna array, a scan range associated with the antenna array, a phase shifter precision, a discrepancy between an intended steering direction and an actual steering direction, a type of beam weight determined by a directionality of a steered beam pattern, or any combination thereof.

Aspect 15: The method of Aspect 14, further comprising transmitting an update or configuration associated with one or more of the number of antenna elements in the antenna array is dynamically updated, the scan range associated with the antenna array is dynamically updated, the phase shifter precision is dynamically configured, or any combination thereof.

Aspect 16: The method of any of Aspects 11-15, wherein the one or more beamforming assistance signals include one or more requests for a mission-mode calibration signal, one or more requests for on-demand reference signals, a feedback message, or any combination thereof.

Aspect 17: The method of any of Aspects 11-16, further comprising transmitting an adjusted link budget as a result of receiving the beamforming calibration update request.

Aspect 18: The method of any of Aspects 11-17, further comprising transmitting an adjusted MCS, a performance parameter, or any combination thereof, as a result of receiving the beamforming calibration update request.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      detect one or more trigger conditions;
      transmit a beamforming calibration update request as a result of detecting the one or more trigger conditions;
      receive one or more beamforming assistance signals in response to the beamforming calibration update request; and
      update at least one beamforming parameter of one or more beamforming parameters in a beamforming calibration configuration based, at least in part, on the one or more beamforming assistance signals.

2. The UE of claim 1, wherein the one or more processors are further configured to store the beamforming calibration configuration including the one or more beamforming parameters.

3. The UE of claim 2, wherein the one or more processors, to store the beamforming calibration configuration, are configured to store the beamforming calibration configuration including the one or more beamforming parameters in a look-up table, and
   to update the at least one of the one or more beamforming parameters in the beamforming calibration configuration, are configured to update the at least one of the one or more beamforming parameters in the look-up table.

4. The UE of claim 1, wherein the one or more processors, to transmit the beamforming calibration update request, are configured to transmit the beamforming calibration update request via an uplink control information (UCI) signal, a radio resource control (RRC) signal, or a medium access control control element (MAC-CE) signal.

5. The UE of claim 1, wherein the beamforming calibration update request is transmitted via separately formulated or standardized signaling or messaging indicating an insufficient beamforming calibration.

6. The UE of claim 1, wherein the one or more trigger conditions are based, at least in part, on a number of antenna elements in an antenna array, a scan range associated with the antenna array, a phase shifter precision, a discrepancy between an intended steering direction and an actual steering direction, a type of beam weight determined by a directionality of a steered beam pattern, or any combination thereof.

7. The UE of claim 6, wherein detecting the one or more trigger conditions includes receiving an update or configuration associated with one or more of the number of antenna elements in the antenna array, the scan range associated with the antenna array, the phase shifter precision, or any combination thereof.

8. The UE of claim 1, wherein the one or more beamforming assistance signals include one or more requests for a mission-mode calibration signal, one or more requests for on-demand reference signals, a feedback message, or any combination thereof.

9. The UE of claim 1, wherein the one or more processors are further configured to receive an adjusted link budget as a result of transmitting the beamforming calibration update request.

10. The UE of claim 1, wherein the one or more processors are further configured to receive an adjusted modulation and coding scheme (MCS), a performance parameter, or any combination thereof, as a result of transmitting the beamforming calibration update request.

11. A network node for wireless communication, comprising:
    a memory; and
    one or more processors, coupled to the memory, configured to:
       receive a beamforming calibration update request as a result of a user equipment (UE) detecting one or more trigger conditions associated with one or more beamforming parameters included in a beamforming calibration configuration; and
       transmit one or more beamforming assistance signals in response to the beamforming calibration update request, the one or more beamforming assistance signals including information for the UE to update at least one of the one or more beamforming parameters in the beamforming calibration configuration.

12. The network node of claim 11, wherein the beamforming calibration update request is transmitted via separately formulated or standardized signaling or messaging indicating an insufficient beamforming calibration.

13. The network node of claim 11, wherein the one or more trigger conditions are based, at least in part, on a number of antenna elements in an antenna array, a scan range associated with the antenna array, a phase shifter precision, a discrepancy between an intended steering direction and an actual steering direction, a type of beam weight determined by a directionality of a steered beam pattern, or any combination thereof.

14. The network node of claim 11, wherein the one or more beamforming assistance signals include one or more requests for a mission-mode calibration signal, one or more requests for on-demand reference signals, a feedback message, or any combination thereof.

15. The network node of claim 11, wherein the one or more processors are further configured to transmit an adjusted link budget as a result of receiving the beamforming calibration update request.

16. The network node of claim 11, wherein the one or more processors are further configured to transmit an adjusted modulation and coding scheme (MCS), a performance parameter, or any combination thereof, as a result of receiving the beamforming calibration update request.

17. A method of wireless communication performed by a user equipment (UE), comprising:

detecting one or more trigger conditions;

transmitting a beamforming calibration update request as a result of detecting the one or more trigger conditions;

receiving one or more beamforming assistance signals in response to the beamforming calibration update request; and updating at least one beamforming parameter of one or more beamforming parameters in a beamforming calibration configuration based, at least in part, on the one or more beamforming assistance signals.

18. The method of claim 17, further comprising storing the beamforming calibration configuration including the one or more beamforming parameters.

19. The method of claim 18, wherein storing the beamforming calibration configuration includes storing the one or more beamforming parameters in a look-up table; and wherein updating the at least one of the one or more beamforming parameters in the beamforming calibration configuration includes updating the at least one of the one or more beamforming parameters in the look-up table.

20. The method of claim 17, wherein the beamforming calibration update request is transmitted via separately formulated or standardized signaling or messaging indicating an insufficient beamforming calibration.

21. The method of claim 17, wherein the one or more trigger conditions are based, at least in part, on a number of antenna elements in an antenna array, a scan range associated with the antenna array, a phase shifter precision, a discrepancy between an intended steering direction and an actual steering direction, a type of beam weight determined by a directionality of a steered beam pattern, or any combination thereof.

22. The method of claim 17, wherein the one or more beamforming assistance signals include one or more requests for a mission-mode calibration signal, one or more requests for on-demand reference signals, a feedback message, or any combination thereof.

23. The method of claim 17, further comprising receiving an adjusted link budget as a result of transmitting the beamforming calibration update request.

24. The method of claim 17, further comprising receiving an adjusted modulation and coding scheme (MCS), a performance parameter, or any combination thereof, as a result of transmitting the beamforming calibration update request.

25. A method of wireless communication performed by a network node, comprising:

receiving a beamforming calibration update request as a result of a user equipment (UE) detecting one or more trigger conditions associated with one or more beamforming parameters included in a beamforming calibration configuration; and transmitting one or more beamforming assistance signals in response to the beamforming calibration update request, the one or more beamforming assistance signals including information for the UE to update at least one of the one or more beamforming parameters in the beamforming calibration configuration.

26. The method of claim 25, wherein the beamforming calibration update request is transmitted via separately formulated or standardized signaling or messaging indicating an insufficient beamforming calibration.

27. The method of claim 25, wherein the one or more trigger conditions are based, at least in part, on a number of antenna elements in an antenna array, a scan range associated with the antenna array, a phase shifter precision, a discrepancy between an intended steering direction and an actual steering direction, a type of beam weight determined by a directionality of a steered beam pattern, or any combination thereof.

28. The method of claim 25, wherein the one or more beamforming assistance signals include one or more requests for a mission-mode calibration signal, one or more requests for on-demand reference signals, a feedback message, or any combination thereof.

29. The method of claim 25, further comprising transmitting an adjusted link budget as a result of receiving the beamforming calibration update request.

30. The method of claim 25, further comprising transmitting an adjusted modulation and coding scheme (MCS), a performance parameter, or any combination thereof, as a result of receiving the beamforming calibration update request.

* * * * *